United States Patent
Jeong et al.

(10) Patent No.: US 11,381,844 B2
(45) Date of Patent: Jul. 5, 2022

(54) METHOD AND APPARATUS FOR ENCODING/DECODING IMAGES USING A PREDICTION METHOD ADOPTING IN-LOOP FILTERING

(71) Applicant: Dolby Laboratories Licensing Corporation, San Francisco, CA (US)

(72) Inventors: Je Chang Jeong, Seoul (KR); Ki Baek Kim, Seoul (KR); Dong Jin Jung, Seoul (KR)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 16/991,312

(22) Filed: Aug. 12, 2020

(65) Prior Publication Data
US 2020/0374563 A1    Nov. 26, 2020

Related U.S. Application Data

(63) Continuation of application No. 16/261,390, filed on Jan. 29, 2019, now Pat. No. 10,785,503, which is a
(Continued)

(30) Foreign Application Priority Data

Apr. 21, 2011  (KR) .................. 10-2011-0037484

(51) Int. Cl.
  *H04N 7/18*     (2006.01)
  *H04N 19/80*    (2014.01)
  (Continued)

(52) U.S. Cl.
  CPC ........... *H04N 19/80* (2014.11); *H04N 19/126* (2014.11); *H04N 19/176* (2014.11);
  (Continued)

(58) Field of Classification Search
  CPC ...... H04N 19/80; H04N 19/45; H04N 19/126; H04N 19/182; H04N 19/186; H04N 19/44;
  (Continued)

(56) References Cited

U.S. PATENT DOCUMENTS 6,163,868 A    12/2000   Kondo et al.
6,282,684 B1    8/2001   Kondo et al.
(Continued)

OTHER PUBLICATIONS

De Souza et al., "HEVC In-Loop Filters GPU Parallelization in Embedded Systems" (Year: 2015).
(Continued)

*Primary Examiner* — Shan E Elahi
(74) *Attorney, Agent, or Firm* — Wong & Rees LLP; Zhichong Gu

(57) ABSTRACT

Disclosed is a prediction method adopting in-loop filtering. According to the present invention, a prediction method for encoding and decoding video comprises the following steps: generating a residual block of the current block through an inverse quantization and inverse transform; generating a prediction block of the current block through an intra-prediction; performing in-loop filtering on the current block in which the residual block and the prediction block are combined; and storing the current block, on which the in-loop filtering is performed, in a frame buffer for an intra-prediction of the next block to be encoded. As described above, prediction is performed using an in-loop filter during processes for encoding and decoding video, thereby improving the accuracy of prediction and reducing errors in prediction, thus improving the efficiency of video compression and reducing the amount of data to be transmitted.

8 Claims, 11 Drawing Sheets

Related U.S. Application Data continuation of application No. 15/210,978, filed on Jul. 15, 2016, now Pat. No. 10,237,577, which is a continuation of application No. 14/609,472, filed on Jan. 30, 2015, now Pat. No. 9,420,312, which is a continuation of application No. 13/877,253, filed as application No. PCT/KR2012/003125 on Apr. 23, 2012, now Pat. No. 9,008,180.

(51) Int. Cl.
| | |
|---|---|
| H04N 19/176 | (2014.01) |
| H04N 19/593 | (2014.01) |
| H04N 19/82 | (2014.01) |
| H04N 19/50 | (2014.01) |
| H04N 19/44 | (2014.01) |
| H04N 19/86 | (2014.01) |
| H04N 19/126 | (2014.01) |
| H04N 19/182 | (2014.01) |
| H04N 19/186 | (2014.01) |
| H04N 19/117 | (2014.01) |
| H04N 19/59 | (2014.01) |

(52) U.S. Cl.
CPC ......... *H04N 19/182* (2014.11); *H04N 19/186* (2014.11); *H04N 19/44* (2014.11); *H04N 19/45* (2014.11); *H04N 19/50* (2014.11); *H04N 19/593* (2014.11); *H04N 19/82* (2014.11); *H04N 19/86* (2014.11); *H04N 19/117* (2014.11); *H04N 19/59* (2014.11)

(58) Field of Classification Search
CPC ...... H04N 19/86; H04N 19/50; H04N 19/176; H04N 19/593; H04N 19/82; H04N 19/117; H04N 19/59; H04N 19/85
USPC .................................................. 375/240.12
See application file for complete search history.

(56) References Cited

U.S. PATENT DOCUMENTS

| | | | |
|---|---|---|---|
| 6,295,008 | B1 | 9/2001 | Kondo et al. |
| 6,298,085 | B1 | 10/2001 | Kondo et al. |
| 6,311,297 | B1 | 10/2001 | Kondo et al. |
| 6,332,042 | B1 | 12/2001 | Kondo et al. |
| 8,451,904 | B2 | 5/2013 | Reznik et al. |
| 8,462,842 | B2 | 6/2013 | Ye et al. |
| 8,559,514 | B2 | 10/2013 | Molloy et al. |
| 8,611,435 | B2 | 12/2013 | Ye et al. |
| 8,718,144 | B2 | 5/2014 | Reznik et al. |
| 8,755,444 | B2 | 6/2014 | Wei et al. |
| 8,831,086 | B2 | 9/2014 | Ye et al. |
| 8,934,543 | B2 | 1/2015 | Yu et al. |
| 8,964,852 | B2 | 2/2015 | Chong et al. |
| 8,964,853 | B2 | 2/2015 | Chong et al. |
| 9,008,180 | B2* | 4/2015 | Jeong ................ H04N 19/44 375/240.12 |
| 9,420,312 | B2* | 8/2016 | Jeong ................ H04N 19/176 |
| 10,237,577 | B2* | 3/2019 | Jeong ................ H04N 19/50 |
| 10,390,046 | B2 | 8/2019 | Joshi et al. |
| 10,785,503 | B2* | 9/2020 | Jeong ................ H04N 19/182 |
| 2004/0066974 | A1 | 4/2004 | Karczewicz et al. |
| 2005/0013494 | A1 | 1/2005 | Srinivasan et al. |
| 2005/0207498 | A1 | 9/2005 | Vitali et al. |
| 2005/0276323 | A1 | 12/2005 | Martemyanov et al. |
| 2006/0104354 | A1 | 5/2006 | Han et al. |
| 2006/0146941 | A1 | 7/2006 | Cha et al. |
| 2008/0025398 | A1 | 1/2008 | Molloy et al. |
| 2008/0123750 | A1 | 5/2008 | Bronstein et al. |
| 2008/0193024 | A1* | 8/2008 | Lee ................ H04N 19/423 382/233 |
| 2009/0196342 | A1 | 8/2009 | Escoda et al. |
| 2009/0225842 | A1 | 9/2009 | Cheon et al. |
| 2009/0268823 | A1* | 10/2009 | Dane ................ H04N 19/55 382/256 |
| 2010/0080285 | A1 | 4/2010 | Lee et al. |
| 2010/0158103 | A1 | 6/2010 | Ye et al. |
| 2010/0177822 | A1 | 7/2010 | Karczewicz et al. |
| 2010/0208805 | A1 | 8/2010 | Yu et al. |
| 2010/0208806 | A1* | 8/2010 | Yu ................ H04N 19/82 375/E7.243 |
| 2010/0329362 | A1 | 12/2010 | Choi et al. |
| 2011/0122950 | A1* | 5/2011 | Ji ................ H04N 19/51 375/E7.243 |
| 2011/0206135 | A1 | 8/2011 | Drugeon et al. |
| 2011/0261880 | A1 | 10/2011 | Auyeung |
| 2011/0317757 | A1 | 12/2011 | Coban et al. |
| 2012/0027089 | A1 | 2/2012 | Chien et al. |
| 2012/0033728 | A1* | 2/2012 | Cho ................ H04N 19/124 375/240.03 |
| 2012/0044986 | A1 | 2/2012 | Chong et al. |
| 2012/0044992 | A1* | 2/2012 | Chong ................ H04N 19/61 375/240.12 |
| 2012/0051438 | A1 | 3/2012 | Chong et al. |
| 2012/0075436 | A1 | 3/2012 | Chen et al. |
| 2012/0082224 | A1 | 4/2012 | Auwera et al. |
| 2012/0082241 | A1 | 4/2012 | Tsai et al. |
| 2012/0131309 | A1* | 5/2012 | Johnson ................ G06F 8/40 712/E9.004 |
| 2012/0200669 | A1 | 8/2012 | Lai et al. |
| 2012/0213291 | A1 | 8/2012 | Chong et al. |
| 2012/0213292 | A1 | 8/2012 | Chong et al. |
| 2012/0213293 | A1 | 8/2012 | Chong et al. |
| 2012/0294365 | A1* | 11/2012 | Zheng ................ H04N 19/176 382/250 |
| 2013/0034170 | A1 | 2/2013 | Chen et al. |
| 2013/0044809 | A1 | 2/2013 | Chong et al. |
| 2013/0101025 | A1* | 4/2013 | Van der Auwera .. H04N 19/157 375/240.03 |
| 2013/0101039 | A1 | 4/2013 | Florencio |
| 2013/0107947 | A1 | 5/2013 | Lee et al. |
| 2013/0107963 | A1 | 5/2013 | Wahadaniah et al. |
| 2013/0182757 | A1 | 7/2013 | Karczewicz et al. |
| 2013/0188744 | A1 | 7/2013 | Auwera et al. |
| 2013/0208794 | A1 | 8/2013 | Jeong et al. |
| 2013/0259120 | A1 | 10/2013 | Auwera et al. |
| 2013/0287109 | A1 | 10/2013 | Wang et al. |
| 2014/0348233 | A1 | 11/2014 | Kondo |
| 2014/0362922 | A1 | 12/2014 | Puri et al. |
| 2015/0023405 | A1 | 1/2015 | Joshi et al. |
| 2015/0139319 | A1 | 5/2015 | Jeong et al. |
| 2015/0146779 | A1 | 5/2015 | Bang et al. |
| 2016/0330485 | A1 | 11/2016 | Jeong et al. |
| 2016/0345025 | A1 | 11/2016 | Jeong et al. |
| 2018/0183650 | A1 | 6/2018 | Zhang et al. |
| 2019/0158883 | A1 | 5/2019 | Jeong et al. |

OTHER PUBLICATIONS

Park et al., "CNN-Based In-Loop Filtering For Coding Efficiency Improvement" (Year: 2016).
United States Patent and Trademark Office, U.S. Appl. No. 15/210,967, Final Office Action dated Jun. 6, 2018.
United States Patent and Trademark Office, U.S. Appl. No. 15/210,967, Non-Final Office Action dated Jan. 4, 2018.
United States Patent and Trademark Office, U.S. Appl. No. 15/210,967, Notice of Allowance dated Aug. 7, 2018.
United States Patent and Trademark Office, U.S. Appl. No. 15/210,978, Final Office Action dated May 24, 2018.
United States Patent and Trademark Office, U.S. Appl. No. 15/210,978, Non-Final Office Action dated Jan. 3, 2018.
United States Patent and Trademark Office, U.S. Appl. No. 15/210,978, Notice of Allowance dated Nov. 15, 2018.
United States Patent and Trademark Office, U.S. Appl. No. 16/261,390, Final Office Action dated Mar. 17, 2020.
United States Patent and Trademark Office, U.S. Appl. No. 16/261,390, Non-Final Office Action dated Nov. 14, 2019.

(56) References Cited

OTHER PUBLICATIONS

United States Patent and Trademark Office, U.S. Appl. No. 16/261,390, Notice of Allowance dated May 19, 2020.

* cited by examiner

FIG. 6A

| a1 | a2 | a3 | a4 | a5 | a6 | a7 | a8 |
|----|----|----|----|----|----|----|----|
| b1 | b2 | b3 | b4 | b5 | b6 | b7 | b8 |
| c1 | c2 | c3 | c4 | c5 | c6 | c7 | c8 |
| d1 | d2 | d3 | d4 | d5 | d6 | d7 | d8 |
| e1 | e2 | e3 | e4 | e5 | e6 | e7 | e8 |
| f1 | f2 | f3 | f4 | f5 | f6 | f7 | f8 |
| g1 | g2 | g3 | g4 | g5 | g6 | g7 | g8 |
| h1 | h2 | h3 | h4 | h5 | h6 | h7 | h8 |

DIAGONAL DOWN-RIGHT

FIG. 6B

| a1 | a2 | a3 | a4 | a5 | a6 | a7 | a8 |
|----|----|----|----|----|----|----|----|
| b1 | b2 | b3 | b4 | b5 | b6 | b7 | b8 |
| c1 | c2 | c3 | c4 | c5 | c6 | c7 | c8 |
| d1 | d2 | d3 | d4 | d5 | d6 | d7 | d8 |
| e1 | e2 | e3 | e4 | e5 | e6 | e7 | e8 |
| f1 | f2 | f3 | f4 | f5 | f6 | f7 | f8 |
| g1 | g2 | g3 | g4 | g5 | g6 | g7 | g8 |
| h1 | h2 | h3 | h4 | h5 | h6 | h7 | h8 |

DIAGONAL DOWN-RIGHT

WHEN TWO BLOCKS ARE DIAGONAL DOWN-RIGHT

WHEN TWO BLOCKS ARE VERTICAL x : INTRA PREDICTION OF LEFT BLOCK (0: FIRST INTRA PREDICTION, 1: SECOND INTRA PREDICTION)

y : INTRA PREDICTION OF UP BLOCK (0: FIRST INTRA PREDICTION, 1: SECOND INTRA PREDICTION)

a : PROBABILITY OF FIRST INTRA PREDICTION METHOD BEING SELECTED b : PROBABILITY OF SECOND INTRA PREDICTION METHOD BEING SELECTED

| (x, y) | (0, 0) | (1, 0) or (0, 1) | (1, 1) |
|---|---|---|---|
| PROBABILITY DISTRIBUTION | a > b | a > b | a < b |

METHOD AND APPARATUS FOR ENCODING/DECODING IMAGES USING A PREDICTION METHOD ADOPTING IN-LOOP FILTERING

CROSS-REFERENCE TO RELATED APPLICATIONS

This application is a Continuation of U.S. patent application Ser. No. 16/261,390 filed on Jan. 29, 2019, which is a continuation of U.S. patent application Ser. No. 15/210,978 filed on Jul. 15, 2016, which is a continuation of U.S. patent application Ser. No. 14/609,472 filed on Jan. 30, 2015, which is a continuation of U.S. patent application Ser. No. 13/877,253 filed on Apr. 1, 2013, which is a National Stage of International Application No. PCT/KR2012/003125, filed Apr. 23, 2012, and published as WO2012/144876 on Oct. 26, 2012, which claims benefit under 35 U.S.C. § 119(a) of Korean Patent Application No. 10-2011-0037484 filed Apr. 21, 2011, in the Korean Intellectual Property Office, the contents of all of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to video encoding and decoding, and more particularly, to a prediction method capable of reducing a prediction error and increasing video compression efficiency by achieving more accurate prediction in a video encoding and decoding process.

BACKGROUND

A process of compressing video data to store or send the video data is required due to its large size. Typically, when video data is encoded, the video data is encoded by performing intra prediction or inter prediction, transformation, quantization, entropy coding, or the like on each picture of the video data in units of blocks.

Particularly, in the intra prediction, prediction from an adjacent block is performed using spatial duplication in order to reduce duplication of data in a video. For example, in existing intra prediction of H.264/AVC, extrapolation is performed using nine modes. The intra prediction has a drawback in that accurate prediction is difficult as a pixel to be predicted is away from a reference pixel. Particularly, use of existing intra prediction in representing texture degrades accuracy of the prediction.

Further, in the intra prediction or the inter-frame prediction, distortion between an original video and a restored video may occur or may degrade accuracy of subsequent intra prediction or inter-frame prediction.

BRIEF DESCRIPTION OF THE DRAWINGS

FIGS. 6A and 6B are conceptual diagrams for explaining a concept of in-loop filtering for a current block boundary in the intra prediction method according to the present invention.

BRIEF SUMMARY OF INVENTION

Technical Problem

Figure 1:
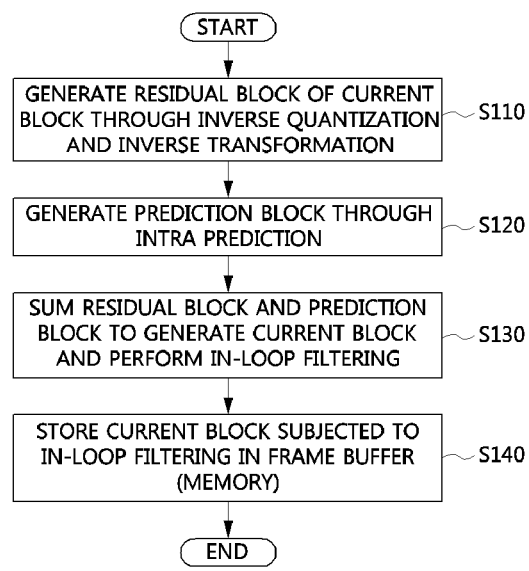
FIG. 1 is a flowchart for explaining an intra prediction method according to the present invention.

An object of the present invention for resolving the problems as described above is to provide a prediction method capable of reducing a prediction error and reducing an amount of data to be sent from an encoder to a decoder by increasing prediction accuracy through prediction with an in-loop filter.

Technical Solution

The present invention for achieving the above object provides an intra prediction method for video encoding and decoding, the method including steps of: generating a residual block of a current block through inverse quantization and inverse transformation; generating a prediction block of the current block through intra prediction; performing in-loop filtering on a current block obtained by summing the residual block and the prediction block step; and storing the current block subjected to the in-loop filtering in a frame buffer for intra prediction of a next encoding target block.

Here, the step of generating a prediction block may include determining an optimal prediction mode with minimum coding cost from pixels placed in an encoded or decoded block adjacent to the current block and generating a prediction block having a prediction pixel value predicted according to the determined prediction mode.

Here, the step of generating a prediction block may include forming a template for an encoded or decoded block adjacent to the current block and generating a prediction block having a prediction pixel value from pixels of the template.

Here, the step of performing in-loop filtering may include performing the in-loop filtering on a down boundary and right boundary of the current block.

Here, the step of performing in-loop filtering may include adjusting whether to perform filtering, the type of filtering, and intensity of the filtering based on an intra prediction direction of blocks adjacent to the current block.

Here, the step of performing in-loop filtering may include adjusting whether to perform filtering, the type of filtering, and intensity of the filtering according to whether prediction methods for the current block and the block adjacent to the current block are the same or not.

An aspect of the present invention for achieving the other object provides a prediction method for video encoding and decoding, the method including steps of: generating a residual video of a current video subjected to inverse quantization and inverse transformation; generating a prediction video of the current video through intra prediction or inter-frame prediction; summing the residual video and the prediction video to generate a restored video, and performing in-loop filtering on the restored video based on distortion between an original video of the restored video and the restored video or based on characteristics of the restored video; and storing the restored video subjected to the in-loop filtering in a frame buffer for prediction of a next encoding target video.

Here, the step of performing in-loop filtering may include de-blocking filtering, and may further include at least one additional filtering.

Here, the at least one additional filtering may include performing filtering on the restored video using a difference between a pixel of the original video and a pixel of the restored video due to distortion between the original video of the restored video and the restored video or using a coefficient based on the difference.

Here, the step of performing in-loop filtering may include determining the number of filterings or the type of filtering based on a size or directivity of a block into which the restored video has been divided for the in-loop filtering.

Another aspect of the present invention for achieving the other object provides a device for video encoding, the device including: a prediction unit that generates a prediction video of a current video through intra prediction or inter-frame prediction; a subtraction unit that generates a residual video of a current video through inverse quantization and inverse transformation; an in-loop filter unit that sums the residual video and the prediction video to generate a restored video, and performs in-loop filtering on the restored video based on distortion between an original video of the restored video and the restored video or based on characteristics of the restored video; and a memory unit that stores the restored video subjected to the in-loop filtering for prediction of a next encoding target video.

A still another aspect of the present invention for achieving the other object provides a device for video decoding, the device including: a decoding unit that generates a residual video of a current video by decoding a bit stream; a prediction unit that generates a prediction video of a current video through intra prediction or inter-frame prediction; an addition unit that sums the residual video and the prediction video to generate a restored video; an in-loop filter unit that performs in-loop filtering on the restored video based on distortion between an original video of the restored video and the restored video or based on characteristics of the restored video; and a memory unit that stores the restored video subjected to the in-loop filtering for prediction of a next encoding target video.

A still another aspect of the present invention for achieving the other object provides a method for video decoding, the method including steps of: generating a residual video of a current video by decoding a bit stream; generating a prediction video of a current video through intra prediction or inter-frame prediction; summing the residual video and the prediction video to generate a restored video; performing in-loop filtering on the restored video based on distortion between the original video of the restored video and the restored video or based on characteristics of the restored video; and storing the restored video subjected to the in-loop filtering for prediction of a next encoding target video.

Advantageous Effects

With the prediction method according to the present invention as described above, it is possible to increase prediction accuracy, reduce a prediction error, increase video compression efficiency, and reduce an amount of data to be sent by performing prediction with the in-loop filter in the video encoding and decoding process.

DETAILED DESCRIPTION

While the present invention is susceptible to various modifications and may have several embodiments, specific embodiments thereof are shown by way of example in the drawings and will herein be described in detail. It should be understood, however, that there is no intent to limit the invention to the particular forms, but on the contrary, the invention is to cover all modifications, equivalents, and alternatives falling within the spirit and scope of the invention. Like numbers refer to like elements throughout the description of the figures.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. On the other hand, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a video encoding device or a video decoding device that will be described below may refer to a user terminal such as a personal Computer (PC), a laptop computer, a personal digital assistant (PDA), a portable multimedia player (PMP), a play station portable (PSP), a wireless communication terminal, a smart phone, or a TV, or a server terminal such as an application server or a service server, or may refers to any device including a communication device such as a communication modem for performing communication with various devices or a wired/wireless communication network, a memory for storing various program and data for coding or decoding a video or performing inter-frame or intra prediction for coding or decoding, a microprocessor for executing the program to perform computation and control, and the like.

Further, a video encoded into a bit stream by the video encoding device may be sent to the video decoding device in real time or in non-real time via a wired/wireless communication network such as the Internet, a wireless local area communication network, a wireless LAN network, a Wibro network, or a mobile communication network or via various communication interfaces such as cable or universal serial bus (USB), and decoded by the video decoding device to be restored and played back as a video.

Typically, a video may include a series of pictures, and each picture may be divided into a predetermined region such as a frame or block. When a region of the video is divided into blocks, the divided block may be greatly classified into an intra block and an inter block according to a coding method. The intra block refers to a block encoded using an intra prediction coding scheme. The intra prediction coding refers to a scheme of generating a prediction block by predicting a pixel of a current block using pixels of previously encoded, decoded and restored blocks in a current picture that is currently encoded, and encoding a difference value between the prediction block and the current block. The inter block refers to a block encoded using inter prediction coding. The inter prediction coding refers to a scheme of generating a prediction block by predicting a current block in a current picture by referencing one or more past or future pictures, and encoding a difference value between the prediction block and the current block. Here, a frame referenced to encode or decode the current picture is referred to as a reference frame.

Hereinafter, a preferred embodiment according to the present invention will be described in detail with reference to the accompanying drawings.

Meanwhile, the following embodiments will be described based on H.264/AVC codec in order to confirm performance of the present invention, but the technical spirit of the present invention may be widely applied to H.264/AVC as well as video compression technology with an intra prediction method.

Overview of Intra Prediction Method According to the Present Invention

FIG. 1 is a flowchart for explaining an intra prediction method according to the present invention.

Referring to FIG. 1, an intra prediction method according to the present invention may include step S110 of generating a residual block through inverse quantization and inverse transformation, step S120 of generating a prediction block through intra prediction, step S130 of performing in-loop filtering on a current block obtained by summing the residual block and the prediction block, and step S140 of storing the current block subjected to the in-loop filtering in a frame buffer for intra prediction of a next encoding target block, in an intra prediction method.

First, step S110 is a step of generating a residual block through inverse quantization and inverse transformation, and may be described differently according to a case in which the intra prediction is performed in a video coding process and a case in which the intra prediction is performed in a video decoding process.

When step S110 described above is performed in the video coding process, a residual block having a difference value between a predicted prediction block and a encoding target block is subjected to transformation and quantization and then to inverse quantization and inverse transformation. This is a process for re-generating, in the coding process, the same residual block as a residual block generated through inverse quantization and inverse transformation in a decoding process, and referencing the residual block in a subsequent coding process. That is, the residual block generated herein is a block summed with the intra-predicted prediction block to generate a current block in the video coding process.

When step S110 described above is performed in the video decoding process, a residual block is generated through entropy decoding, inverse quantization and inverse transformation from a received bit stream. That is, the residual block generated in the video coding process described above and the residual block generated in the video decoding process have the same configuration. In this case, in the inverse quantization process, quantization frequency coefficients of the quantized residual block are inversely quantized to generate a frequency coefficient, and in the inverse transformation process, the residual block inversely quantized through the inverse quantization is inversely transformed.

Next, step S120 is a step of generating a prediction block through the intra prediction. Two representative methods below may be used.

In a first method, a pixel value of each pixel in a current block to be encoded in a video is predicted from pixels in an adjacent block according to an optimal determined prediction mode, and a prediction block having the prediction pixel value of each pixel is generated. Here, as the optimal prediction mode, a prediction mode with minimum coding cost may be determined from among various intra prediction modes for intra prediction (e.g., in H.264/AVC, nine prediction modes in each of intra 8×8 prediction and intra 4×4 prediction and four prediction modes in intra 16×16 prediction).

Figure 2:
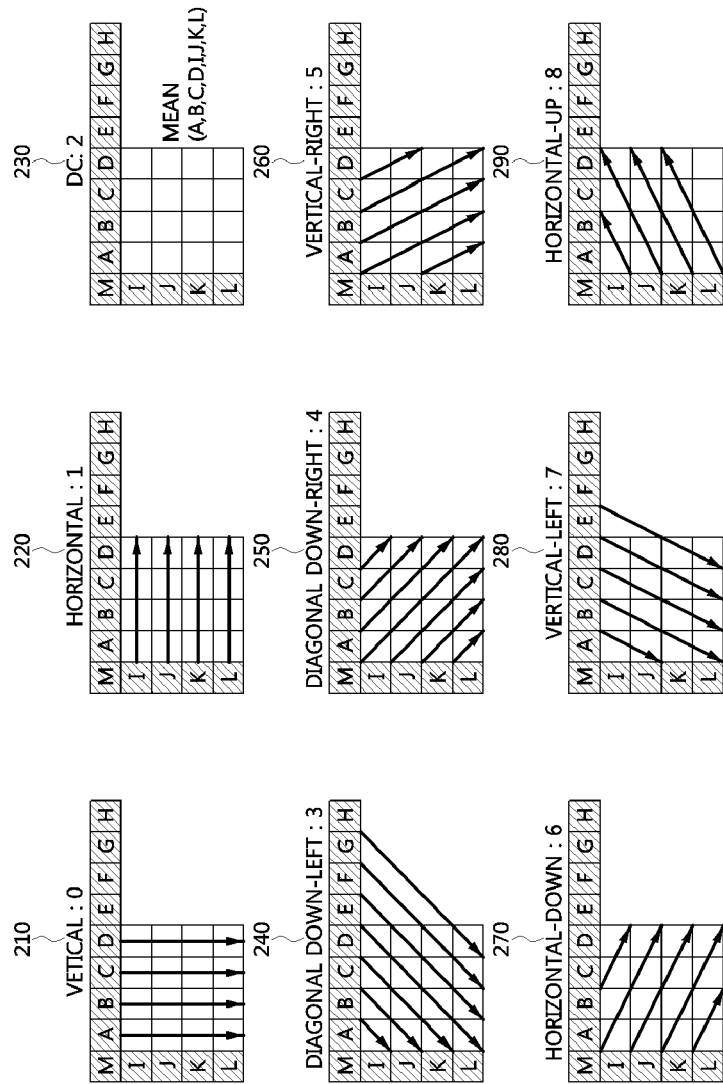
FIG. 2 is a conceptual diagram for explaining intra prediction modes for a 4×4 pixel block in H.264/AVC.

FIG. 2 is a conceptual diagram for explaining intra prediction modes for a 4×4 pixel block in H.264/AVC.

Referring to FIG. 2, intra prediction modes of a 4×4 pixel block include nine prediction modes, including a vertical mode 210, a horizontal mode 220, a DC (Direct Current) mode 230, a diagonal down-left mode 240, a diagonal down-right mode 250, a vertical-right mode 260, a horizontal-down mode 270, a vertical-left mode 280 and a horizontal-up mode 290. Meanwhile, In the case of a 16×16 pixel block, there are four prediction modes. In HEVC, more prediction modes are prepared. In step S120 of generating a prediction block, coding cost of each prediction mode may be calculated according to a block mode or a block size of a encoding target block, and a prediction mode with minimum coding cost may be determined as an optimal intra prediction mode to generate the prediction block.

As a second method, the prediction block generation step S120 described above may be performed using another method discussed in HEVC (High-Efficiency Video Coding) or the like that is standardized as a next-generation video compression standard of H.264/AVC, and greatly, two schemes are available. However, the prediction block generation step S120 may be performed using two methods that will be described below as well as various prediction methods for generating a prediction block from a previously encoded region.

Figure 3A:
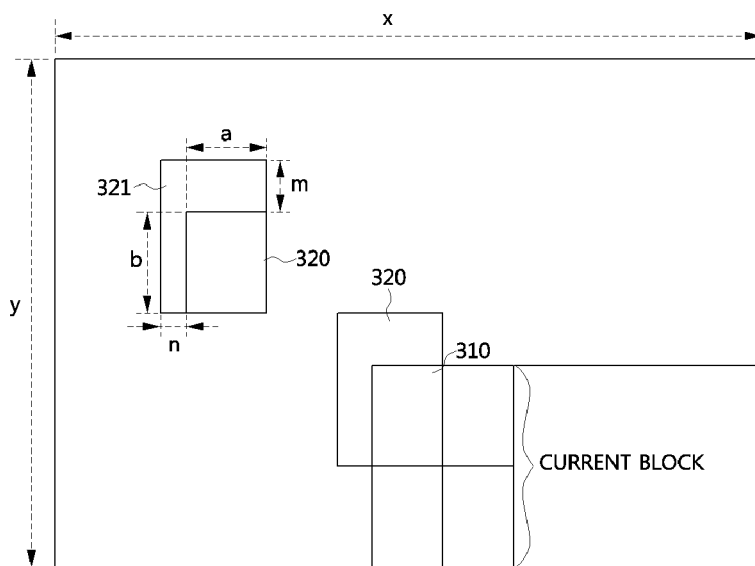
FIG. 3A is a conceptual diagram for explaining an intra prediction method through formation of a template.
Figure 3B:
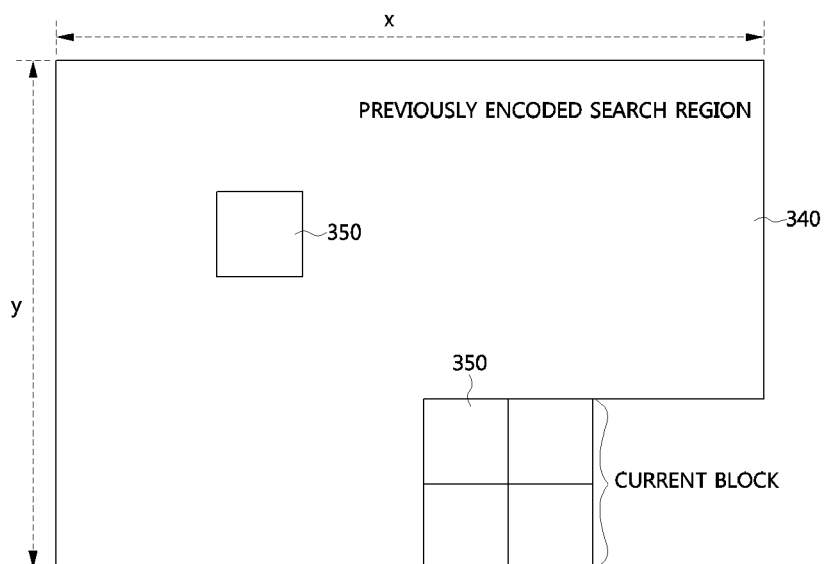
FIG. 3B is a conceptual diagram for explaining a method of performing intra prediction from a previously encoded region rather than an adjacent block.

FIG. 3A is a conceptual diagram for explaining an intra prediction method through formation of a template, and FIG. 3B is a conceptual diagram for explaining a method of performing intra prediction from a previously encoded region rather than an adjacent block.

Referring to FIG. 3A, in the prediction block generation step S120, a template 311 for a current block 310 to be encoded in a video may be formed, and a previously encoded region of a current picture may be searched for a candidate template 321 most similar to the formed template to predict the current block from a candidate block 320 in which a pixel value of each pixel has been previously encoded or decoded in a frame.

Further, in the prediction block generation step S120, as shown in FIG. 3B, a previously encoded search region 340 of a current picture may be searched for a candidate block 350 most similar to the current block 330 to generate a prediction block, as in inter-frame prediction. In this case, when the previously encoded region of the current picture is searched for the block most similar to the current block to generate the prediction block as in the inter-frame prediction, information for a motion vector or the like may be sent to a decoder.

When the block is predicted through extrapolation in the first method, it is difficult to accurately predict the block if the block is away from the referenced adjacent block or if the current block is included in a repeated region. This problem can be overcome by the method of FIGS. 3A and 3B described above.

Figure 4:
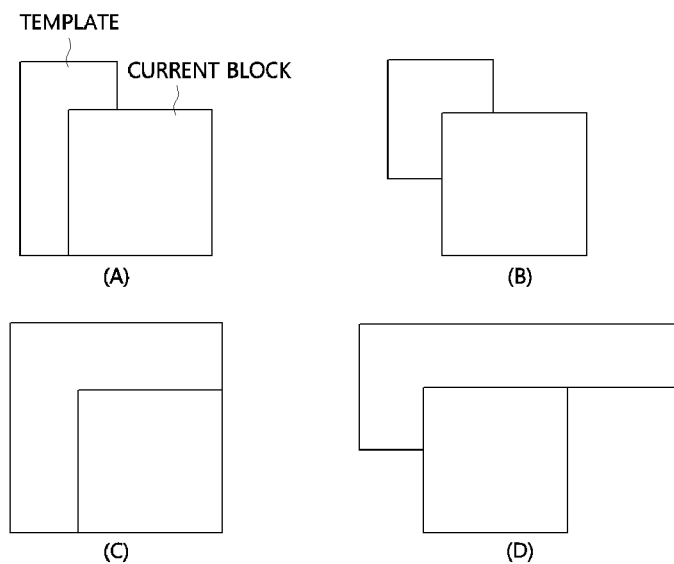
FIG. 4 is a conceptual diagram for explaining various schemes of forming a template in an intra prediction method through template formation.

FIG. 4 is a conceptual diagram for explaining various schemes of forming a template in an intra prediction method through template formation.

Referring to FIG. 4 together with FIG. 3A, when a current block is predicted using the template, the template may be formed by differently setting a, b, m, and n or may be set to have various shapes.

In this case, the same fixed values of a, b, m, and n of the template may be used in the encoder and the decoder, and information on the shape of the template may be sent to the decoder. In this case, the sent information may be sent in units of pictures, slices, blocks, sub-blocks or the like.

Next, step S130 is a step of performing in-loop filtering on a current block obtained by summing the residual block and the prediction block. That is, in the in-loop filtering step S130, a restored current block is filtered. In this case, the filtering is performed to reduce a quantization error or a screen burn-in phenomenon between blocks. When, in the prediction block generation step S120, the prediction is performed by using the template or by searching for the block most similar to the current block, as in the inter-frame prediction, in the intra prediction method, burn-in may exist between blocks or a quantization error may be large in the previously encoded region. In this case, when a template most similar to the template from the adjacent block and the template in the previously encoded region, the similar template cannot be searched for or when a block most similar to the current block is searched for, the similar template cannot be searched for. Accordingly, the in-loop filtering is applied when coding ends in units of blocks.

In this case, the filtering may be performed using an existing de-blocking filter or a scheme similar to or different from the de-blocking filter. The de-blocking filter softens a boundary between the blocks to improve image quality of an encoded or decoded frame.

Further, in the embodiment of the present invention, a filter of another scheme for improving the image quality of the encoded or decoded frame may be applied. A distortion between an original video and a restored video occurring through a coding process, such as quantization, can be compensated through a filter using a difference between a pixel of the original video and a pixel of the restored video due to the distortion or using a coefficient based on the difference. That is, a reference video can be created using a filter capable of compensating for the distortion between the original video and the restored video, and coding efficiency can be improved through the reference video. Further, it is possible to increase accuracy of subsequent intra prediction or inter-frame prediction by reducing the distortion by performing filtering based on characteristics of the restored video and improve coding efficiency.

Lastly, in step S140, the current block subjected to the in-loop filtering is stored in a frame buffer memory for intra prediction of a next encoding target block.

The intra prediction method according to the present invention described above may be more readily described through a configuration of a video encoding device and a video decoding device in which the intra prediction method has been actually implemented, which will be described below. Hereinafter, some embodiments of the intra prediction method according to the present invention described above will be described in detail. A first embodiment and a second embodiment are embodiments in which the in-loop filtering step S130 of the intra prediction method according to the present invention is further embodied. A third embodiment is an embodiment in which the prediction block generation step S120 of the intra prediction method according to the present invention is further embodied. A fourth embodiment and a fifth embodiment are embodiments in which a method of reducing an amount of information delivered from the encoder to the decoder is provided when the intra prediction method according to the present invention is applied.

First Embodiment of Intra Prediction Method According to the Present Invention

Figure 5:
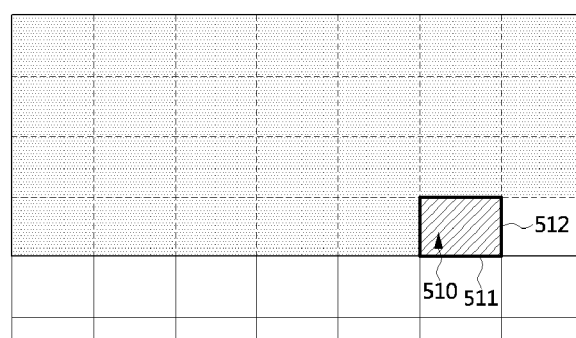
FIG. 5 is a conceptual diagram for explaining an example of in-loop filtering in the intra prediction method according to the present invention.

FIG. 5 is a conceptual diagram for explaining an example of in-loop filtering in the intra prediction method according to the present invention. FIG. 6 is a conceptual diagram for explaining a concept of in-loop filtering for a current block boundary in the intra prediction method according to the present invention.

Referring to FIG. 5, in the intra prediction method according to the present invention, in-loop filtering is performed on the encoded current block 510.

In this case, when intra prediction is performed using the first method described above in the prediction block generation step S120, filtering is applied in a block prediction mode direction to reduce a quantization error. That is, referring to FIG. 6A, since a correlation between decoded pixels placed in the prediction direction is high, filtering is performed on pixels placed at down and right block boundaries 511 and 512 of the encoded block in the prediction mode direction to reduce the quantization error. Accordingly, when a block encoded or decoded subsequent to the current block is predicted using the prediction block generation method described with reference to FIG. 2, coding is performed using a value similar to an original pixel value, thereby reducing the prediction error and increasing the coding efficiency.

Referring to FIG. 6B, the filtering is performed on the pixels placed at the down and right block boundaries of the current block to reduce the quantization error, thereby reducing a prediction error of the block encoded or decoded after the current block and increasing the coding efficiency.

Further, it is possible to reduce the prediction error by correcting the difference between the original pixel and the restored pixel. In other words, filtering may be performed on the restored video or the difference between the original pixel and the restored pixel may be corrected.

For example, a filtering coefficient value may be calculated based on the difference between the original pixel and the restored pixel or a certain coefficient value may be predefined and used. Alternatively, the filtering coefficient value may be calculated based on restored pixels.

When filter coefficient values are determined based on the difference between the original pixel and the restored pixel, information on the coefficient value is sent to the decoder. This information may be sent in units of sequences, slices, blocks or the like. Further, when the certain coefficient value is predefined and used or the filter coefficient value is determined based on the restored pixels, the information may not be separately sent under promise between the encoder and the decoder. That is, it is possible to increase the prediction efficiency by filtering the pixels placed at the right and down block boundaries of the block or all pixels in the block to reduce the quantization error. Alternatively, it is possible to reduce the quantization error by applying filtering for correcting a difference between the original pixel and the restored pixel based on the difference, to the pixels placed at the down and right block boundaries of the current block or all the pixels in the block. In this case, information on the difference is sent to the decoder so that the same process can be performed in the encoder and the decoder.

For example, when the intra prediction is performed using an extrapolation method, the restored block has a large influence on prediction accuracy for a next block to be encoded or decoded (a right, down or lower right block). Accordingly, when such a process is performed, the prediction accuracy increases and the coding efficiency can increase. For the information on the difference between the original pixel and the restored pixel, a difference value may be sent in units of pixels or pixels may be grouped according to a specific criterion and a representative difference value of each group may be sent to the decoder. Here, the specific criterion may be a brightness value of the pixel, slope information or the like.

According to an embodiment of the present invention, a filter correcting the difference value between the pixel of the original video and the pixel of the restored video due to the distortion between the original video and the restored video may be corrected as in FIGS. 6A and 6B or using a coefficient based on the difference may be applied.

In this case, information on the difference between the pixel of the original video and the pixel of the restored video or the coefficient based on the difference may be sent to the decoder in units of sequences, pictures, slices, blocks or the like. Here, the correction of the difference between the original pixel and the restored pixel may be performed by the filter. For example, when filtering is performed based on the distortion between the original video and the restored video, the information on the difference between the pixel of the original video and the pixel of the restored video may be sent to the decoder.

Accordingly, in coding or decoding according to an embodiment of the present invention, whether to perform filtering, the number of filtering (the type of filtering), a filtering direction and a filtering intensity may be changed based on the distortion between the original video of the restored video and the restored video or based on characteristics of the restored video.

That is, according to an embodiment of the present invention, additional filtering for improving image quality of an encoded or decoded frame may be applied. For additional filtering, a method using existing de-blocking filtering, as well as a method using the difference between the pixel of the original video and the pixel of the restored video due to distortion between the original video and the restored video or using the coefficient based on the difference may be utilized. Accordingly, the additional filtering may be applied independently from or together with the de-blocking filtering. Whether to apply the additional filtering may be determined according to a size of the block or directivity of the block.

For example, at least one additional filtering described above may be selectively or essentially performed after the de-blocking filtering is performed, and the number of filterings or the type of filtering may be determined according to the size or the directivity of the block in which the restored video is divided, for in-loop filtering.

Thus, it is possible to reduce the distortion between the original video and the restored video and improve coding efficiency and subjective image quality.

Second Embodiment of Intra Prediction Method According to the Present Invention

Figure 8:
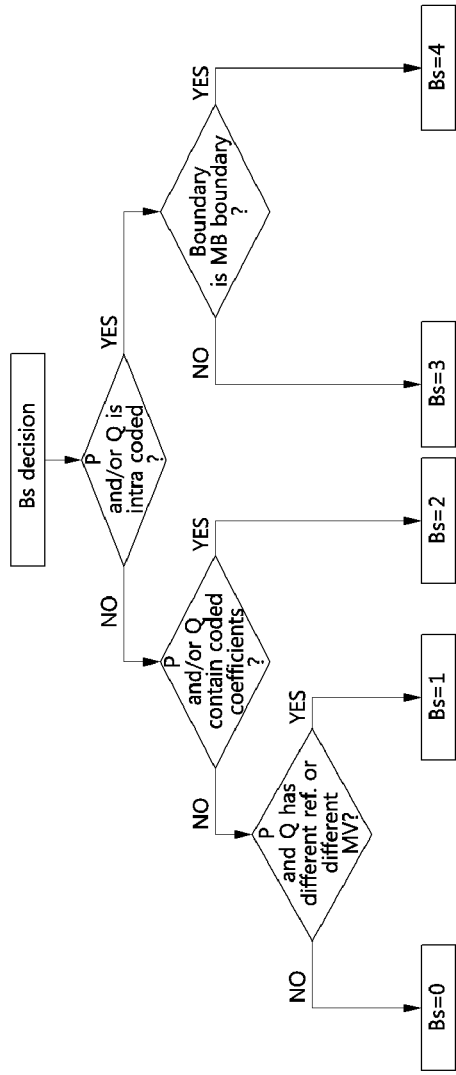
FIG. 8 is a conceptual diagram for explaining a concept of adjusting presence or absence and intensity of in-loop filtering in the prediction method according to the present invention.

FIG. 8 is a conceptual diagram for explaining a concept of adjusting presence or absence and intensity of in-loop filtering in the prediction method according to the present invention.

In an existing in-loop filtering process, after the frame is coded, the frame is subjected to de-blocking filtering and stored in a memory. When inter-frame prediction is performed in a next frame, the frame previously subjected to an in-loop filtering process is referenced. However, in the in-loop filtering proposed in the above invention, in-loop filtering is applied directly after one block is coded. This process is performed on a next block. Using this scheme, a block in which block burn-in has been removed can be predicted by referencing a block in which the quantization error has been removed when the previously encoded block is referenced in a current frame in the intra prediction, which enables more excellent prediction. Further, even in the prediction block generation method described with reference to FIGS. 3A and 3B, since the block burn-in has been reduced at a block boundary in the previously encoded region, the current block can be predicted with high accuracy.

Meanwhile, whether to perform filtering, the number of filterings (the type of filtering), filtering direction, and filtering intensity may be changed according to a prediction mode of a block adjacent to the current block.

Figure 7A:
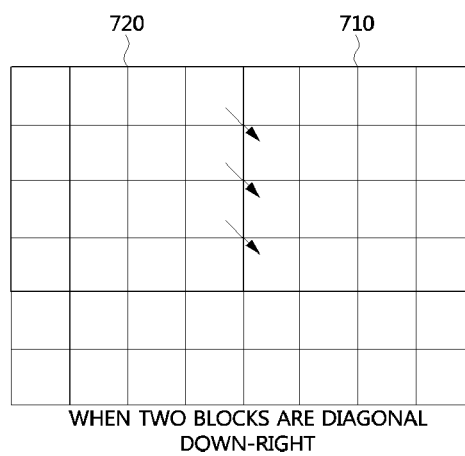
FIGS. 7A and 7B are conceptual diagrams for explaining a concept of performing in-loop filtering based on a prediction mode of a block adjacent to a current block.
Figure 7B:
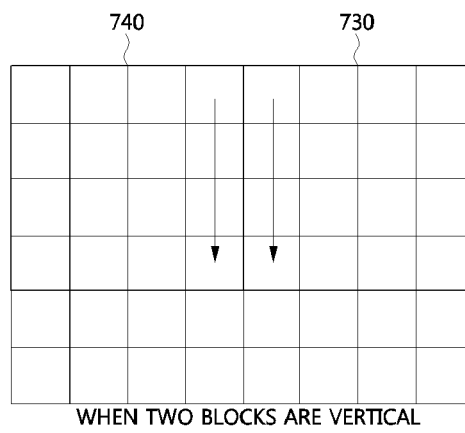

FIGS. 7A and 7B are conceptual diagrams for explaining a concept of performing in-loop filtering based on a prediction mode of a block adjacent to a current block.

Referring to FIG. 7A, a case in which prediction mode directions of a current block 710 and an adjacent block 720 are the same or similar is illustrated. In this case, filtering is performed on pixels placed in the direction.

On the other hand, referring to FIG. 7B, since there is no continuity between a current block 730 and an adjacent block 740, weak filtering is performed or no filtering is performed. If prediction modes of the respective blocks placed at both sides differ, the filtering is performed using an existing method without considering the prediction mode direction. The different number of pixels may be applied the filtering according to a size of the block.

In H.264 that is one existing coding method, there is de-blocking filtering that plays a similar role to filtering that is performed on left and up blocks encoded in the in-loop filtering step S130 of the present invention. In this de-blocking filtering process, when there are coefficients to be sent in the inter-frame prediction, block burn-in is determined to be severe at a boundary of this portion and strong filtering is performed. On the other hand, when there are no coefficients to be sent, there is no or less quantization error in this portion, due to absence of coefficients to be sent. Accordingly, weak filtering is performed or no filtering is performed. Referring to FIG. 8, in the prediction block generation step S120 of the intra prediction method according to the present invention, the encoded or decoded blocks as described with reference to FIG. 3B are searched for a block similar to the current block. When the scheme of generating the block searched for in this process as a prediction block for the current block is used, filtering is performed at left and up block boundaries after the block coding ends in the in-loop filtering S130. In this case, even in the intra prediction, when there are no coefficients to be sent, block burn-in may be determined to be less than when there are coefficients to be sent and weak filtering may be performed or no filtering may be performed, as in the inter-frame prediction. This algorithm is applied even to the intra prediction used in FIG. 3A.

Further, in both the blocks, different filtering may be performed according to whether prediction of each block has been performed using the first method described with reference to FIG. 3A or the second method described with reference to FIG. 3B. For example, when the prediction mode of both the blocks is performed using the second method of the intra prediction, weak filtering may be performed (S850). This is because, when the prediction is performed using the second method, the previously encoded region of the current picture is searched for the block similar to the current block and the prediction is performed, and accordingly, a quantization error is determined to be less as in existing inter-frame prediction, as shown in FIG. 8. Thus, weaker filtering is performed as compared to the intra prediction.

Third Embodiment of Intra Prediction Method According to the Present Invention

Meanwhile, in the prediction block generation step S120 of the intra prediction method according to the present invention, when a prediction method of forming a template for pixels of blocks adjacent to a current block to form a prediction block or searching a previously encoded region for a block similar to the current block to generate the similar block as a prediction block as described with reference to FIGS. 3A and 3B is applied, the template may be formed or the similar block may be searched for with expansion up to a decimal fraction unit pixel rather than an integer unit.

That is, when the template is formed from an adjacent block and a previously encoded region of a current picture is searched for a most similar template to the template or the previously encoded region of the current picture is searched for the block most similar to the current block to generate a prediction block, there is an advantage in that a more accurate block can be searched for when the prediction is performed with expansion up to the decimal fraction unit.

In this case, for information indicating whether to form the template or searching for the prediction block in integer units or with expansion up to any decimal fraction unit (½, ¼ or the like), the same fixed unit may be used in the encoder and the decoder. When data is sent to determine the unit, sending may be performed in several units such as pictures, slices, blocks, or sub-blocks. The above information may be sent or may not be sent according to a prediction method used in the prediction block generation step S120. When the prediction block is searched for with the expansion up to the decimal fraction unit, several interpolation filters (e.g., a 6-tap FIR interpolation filter applied to ¼ pixel inter-frame prediction of H.264/AVC) may be applied in order to create a pixel in a decimal fraction unit.

Fourth Embodiment of Intra Prediction Method According to the Present Invention

The present embodiment illustrates an embodied configuration for reducing an amount of information delivered between the encoder and the decoder when the scheme of searching a previously encoded region for the similar block to generate a prediction block has been applied, which has been described with reference to FIG. 3B, in the prediction block generation step S120 of the intra prediction method according to the present invention.

That is, in the prediction block generation step S120, when the previously encoded region of the current picture is searched for the block most similar to the current block and prediction is performed, a predictor may be variously set and formed when information on a motion is to be sent.

For example, a coordinate at the upper left corner of the current block may be set as the predictor and information on a difference with a motion vector relative to the coordinate may be sent from the encoder to the decoder. Alternatively, a coordinate determined by an optimal template using the template may be set as the predictor, and the information on the difference with the motion vector may be sent to the decoder with reference to the coordinate.

The encoder and the decoder may use the same fixed information, as information on the type of used predictor, and the information may be sent in several cases such as a picture, a slice, a block, or a sub-block. Additionally, several candidate groups of predictors are prepared (for example, several candidate groups including a coordinate in the upper left corner of the current block, and the coordinate determined by the optimal template using the template) and information on optimal predictor candidates with low coding cost in the groups may be sent.

For example, as in FIG. 4, when templates a, b and c are assumed to be present, a previously encoded region is searched for respective most similar templates using the templates and the most similar templates are used as the predictors. In this case, information on shapes of the templates used as the predictors should be sent. Since the three current template predictors are used, a, b, and c may be indexed by 0, 10, and 11 and the information may be set to the decoder. If a difference between values of (x, y) position coordinates of the optimal templates is equal to or smaller than a threshold, the information on template predictor candidates may be omitted. If it is assumed that an optimal template position of the first template predictor candidate among the three template predictor candidates is (−7, −5) relative to a coordinate in the upper left corner of the current block, an optimal template position of the second template predictor candidate is (−6, −6), an optimal template position of the third template predictor candidate (−7, −6) and the threshold is 2, the three optimal coordinates are in a range of the threshold. Accordingly, the templates are templates having similar performance, the information on the optimal templates is not sent, and one of the three templates is used as the predictor according to a predefined rule.

If optimal searched template positions of two of the template predictor candidates has a difference equal to or smaller than the threshold and the optimal template predictor position of the other template predictor candidate has a difference with the two optimal template predictor positions greater than the threshold, the two template predictor candidates are assumed to be templates having similar performance. A comparison with the other template predictor candidate in a difference value with actual motion information is performed and information on the template predictor candidate with less data is sent. (For example, when the optimal template position of the first template predictor is (−7, −5), the optimal template position of the second template predictor is (−6, −5), the optimal template position of the third template predictor is (−3, −1) and the threshold is 2, the first and second template predictors are grouped into one since optimal template positions of the first and second template predictors are in a range of the threshold, the optimal template position of the third template predictor is not in the threshold range relative to the two optimal template positions of the first and second template predictors and accordingly, the third template predictor becomes a different template. Accordingly, the number of the template predictor candidates is 2 (the group is regarded as one template). Codewords '0' and '1' may be allocated to the respective template predictor candidates and information on the template predictor candidates may be set.)

Information on a difference between the motion vector and the predictor may include an absolute value of the difference and a sign component.

Figure 9:
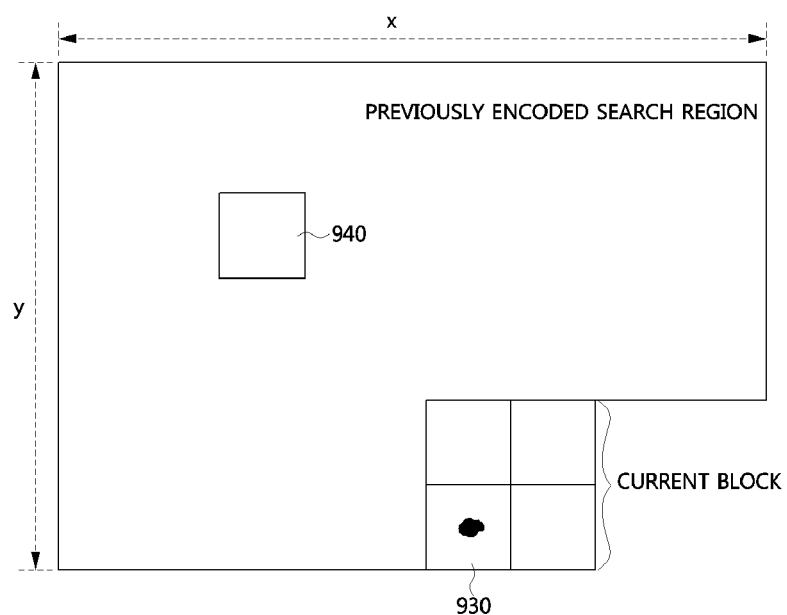
FIG. 9 is a conceptual diagram for explaining a concept of forming difference information of a motion vector and a predictor.

FIG. 9 is a conceptual diagram for explaining a concept of forming difference information of a motion vector and a predictor.

Referring to FIG. 9, if the predictor is the same as a coordinate in the upper left corner of the current block described above when a position of the current block 930 is the same as that illustrated in FIG. 9, information on a sign in a y-axis direction of the motion vector for specifying a candidate block 940 is not necessary when the information on the difference is sent to the decoder. Accordingly, sending the information on a sign to the decoder may be unnecessary (i.e., when the sign in the y-axis direction is fixed since the current block is located in a bottom edge of a search area). When the information on a sign is unnecessary according to the position of the predictor as in the above case, the information on the difference containing no information on a sign is sent to the decoder, thereby increasing the efficiency.

Fifth Embodiment of Intra Prediction Method According to the Present Invention

The present embodiment illustrates an embodied configuration for reducing an amount of information delivered between the encoder and the decoder when the scheme of generating a prediction block using a template, which has been described with reference to FIG. 3A, is applied in the prediction block generation step S120 of the intra prediction method according to the present invention.

That is, when the prediction block is generated using the template in the prediction block generation step S120, several candidate templates are formed and an optimal template is searched for. For example, in order to search for a more accurate template, several candidate templates are formed and an optimal template is searched for, as described with reference to FIG. 4.

Several templates, such as a template with high correlation in a region on the left side of the current block as in FIG. 4a, a template having a higher correlation in a region on the upper left side of the current block as in FIG. 4b, a template with high correlation in an entire position of the current block as in FIG. 4c, and a template having a higher correlation in a region on the upper side of the current block as in FIG. 4d, are formed to perform prediction. For example, when the three templates shown in FIGS. 4a, b, and c are candidates, an optimal prediction block is searched for with each template. Information for a template candidate with low coding cost among the three template candidates may be set and coding may be performed. The information on template candidates is sent to the decoder because, although a template with lowest coding cost is recognized by the decoder using several template candidates, such a template may not be optimal. Thus, information for a template candidate with actually least coding cost among the several candidates is sent. In this case, a short codeword (e.g., '0') may be allocated to a template candidate with a highest frequency (or regarded as having a highest frequency), a long codeword (e.g., '10' or '11') may be allocated to other template candidates, and then information on the template candidate may be sent. The allocation of the codeword to each candidate may be performed using several methods.

If differences of values of (x, y) coordinates of the optimal template positions searched for by the three template candidates are all equal to or smaller than a threshold, the information on a template candidate may be omitted. (For example, if it is assumed that an optimal template position of the first template candidate is (−7, −5) with reference to a coordinate in the upper left corner of the current block, an optimal template position of the second template candidate is (−6, −6), an optimal template position of the third template candidate is (−7, −6), and the threshold is 2, the optimal coordinates of the three template candidates are in a range of the threshold. Accordingly, the template candidates are assumed to be templates having similar performance and the information on the optimal templates is not sent and the current block is predicted using one of the three templates.)

If the optimal template positions searched for by two of the template candidates have a difference equal to or smaller than the threshold and the optimal template position of the other template candidate has a difference with the two optimal template positions greater than the threshold, the two template candidates are assumed to be templates having similar performance. A comparison with the other template candidate in coding cost is performed and information for the template candidate with low cost is sent. (For example, when the optimal template position of the first template is (−7, −5), the optimal template position of the second template is (−6, −5), the optimal template position of the third template is (−3, −1), and the threshold is 2, the optimal template positions of the first and second templates is in a range of the threshold and accordingly, the first and second templates are grouped into one. Since the third template is not in the threshold range relative to the two templates, the third template is a different template. Accordingly, the number of template candidates is 2 (the group of the two templates is regarded as one template). Codewords '0' and '1' may be allocated to the respective template candidates and the information on the template candidate may be sent.

Sixth Embodiment of Intra Prediction Method According to the Present Invention

Figure 12:
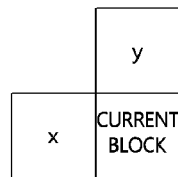
FIG. 12 is a conceptual diagram illustrating a video encoding method according to an embodiment of the present invention.

FIG. 12 is a conceptual diagram illustrating another embodiment of an intra prediction method according to the present invention.

The intra prediction method according to the present invention described with reference to FIG. 12 is a method of calculating a selection probability for an intra prediction method for a current block, which is an intra prediction target, according to a combination of intra prediction methods applied to blocks around the current block, and utilizing the probability in coding.

That is, it is a method of making coding in an intra prediction method for the current block efficient based on a probability inferred from intra prediction methods applied to previously encoded blocks in an intra prediction coding process.

Referring to FIG. 12, when application of a first intra prediction method to a left block X or an up block Y of the current block is indicated by 0 and application of a second intra prediction method is indicated by 1, there are four combinations (0, 0), (1, 0), (0, 1), and (1, 1). For example, a case in which the first intra prediction method is applied to both of the left block and the up block may be represented as (0, 0), and a case in which the first intra prediction method is applied to the left block and the second intra prediction method is applied to the up block may be represented as (0, 1).

In this case, the intra prediction method may refer to an intra mode prediction method based on extrapolation applied to H.264/AVC or the like or the template matching method described above. That is, if the first intra prediction method indicated by 0 is the intra mode prediction method, the second intra prediction method indicated by 1 may be the template matching prediction method.

Further, a probability of the first intra prediction method for the current block being selected may be represented as a, and a probability of the second intra prediction method being selected may be represented as b. In this case, the intra prediction starts with predetermined initial values of a and b, and the values of a and b may be continuously updated during intra prediction coding for blocks. Accordingly, the probability a or b of the first intra prediction method or the second intra prediction method being selected as the intra prediction method to be applied to the current block may be selected according to a combination of the intra prediction methods applied to the left block and the up block.

For example, in FIG. 12, when the first intra prediction method is applied to both of the left block X and the up block Y, the probability to select the first intra prediction method for the current block is higher. Accordingly, a higher probability is set for the first intra prediction method and coding is performed. This probability is applied to a context-based arithmetic encoding scheme to improve efficiency of entire coding.

Meanwhile, in the above-described embodiment, two selectable intra prediction methods are assumed. However, the same scheme may be applied to a case in which there are three selectable intra prediction methods. A description of this case is the same as the foregoing description except that the number of combinations of intra prediction methods applied to the left block and the up block increases.

Configuration example of video encoding device in which intra prediction method according to the present invention has been implemented Hereinafter, a configuration of a video encoding device in which the intra prediction method according to the present invention described above is implemented will be described.

Figure 10:
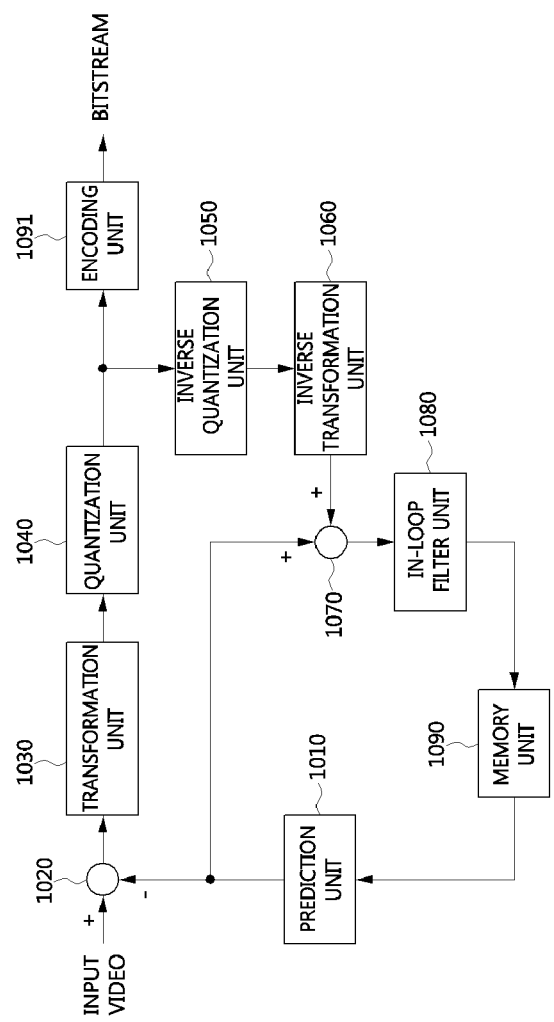
FIG. 10 is a block diagram for explaining a configuration example of a video encoding device in which the intra prediction method according to the present invention has been implemented.

FIG. 10 is a block diagram for explaining a configuration example of a video encoding device in which the intra prediction method according to the present invention has been implemented.

Referring to FIG. 10, a video encoding device may include a prediction unit 1010, a subtraction unit 1020, a transformation unit 1030, a quantization unit 1040, an inverse quantization unit 1050, an inverse transformation unit 1060, an addition unit 1070, an in-loop filter unit 1080, a memory unit 1090, and an encoding unit 1091. Some of the above components may not be necessarily included, and some or all of the components may be selectively included in some implementations.

The prediction unit 1010 performs the prediction block generation step S120 described with reference to FIG. 1 and generates a prediction block to predict a pixel of a current block. That is, the various schemes described in the prediction block generation step S120 of the intra prediction method according to the present invention described with reference to FIGS. 1, 2, 3A and 3B may be applied as a method by which the prediction unit 1010 performs the intra prediction.

The subtraction unit 1020 subtracts the prediction block from a encoding target block (i.e., a current block) to generate a residual block. That is, the subtraction unit 1020 calculates a difference between a pixel value of each pixel of the encoding target block and a prediction pixel value of each pixel of the prediction block predicted by the prediction unit 1010 to generate a residual block including a residual signal in a block form.

The transformation unit 1030 transforms the residual block to a frequency domain and transforms each pixel value of the residual block to a frequency coefficient. Here, the transformation unit 1030 may transform the residual signal to the frequency domain using various transformation schemes of transforming a spatial axis image signal to a frequency axis, such as Hadamard transform or discrete cosine transform based transform. The residual signal transformed to the frequency domain becomes the frequency coefficient.

The quantization unit 1040 quantizes the residual block having the frequency coefficient, which has been transformed to the frequency domain by the transformation unit 1030. Here, the quantization unit 1040 may quantize the transformed residual block using a dead zone uniform threshold quantization (hereinafter referred to as DZUTQ), a quantization weighted matrix, an enhanced quantization scheme thereof, or the like.

The inverse quantization unit 1050 inversely quantizes the residual block quantized by the quantization unit 1040. That is, the inverse quantization unit 1050 inversely quantizes the quantization frequency coefficients of the quantized residual block to generate a residual block having a frequency coefficient.

The inverse transformation unit 1060 inversely transforms the residual block inversely quantized by the inverse quantization unit 1050. That is, the inverse transformation unit 1060 inversely transforms the frequency coefficients of the inversely quantized residual block to generate a residual block having a pixel value, i.e., a restored residual block. Here, the inverse transformation unit 1060 may perform inverse transformation by reversely using the transformation scheme used in the transformation unit 1030.

The addition unit 1070 adds the prediction block predicted by the prediction unit 1010 to the residual block restored by the inverse transformation unit 1060 to restore the current block that is the target block.

The in-loop filter unit 1080 filters the current block restored by the addition unit 1070. In this case, filtering is performed to reduce a quantization error or screen burn-in phenomenon between blocks. When the prediction unit 1010 performs the prediction by using the template or by searching for the block most similar to the current block, as in the inter-frame prediction, in the intra prediction method, burn-in may exist between blocks or the quantization error may be large in in the previously encoded region. In this case, when a template most similar to the template from the adjacent block and the template in the previously encoded region is searched for, the similar template cannot be searched for or when the block most similar to the current block is searched for, the similar block cannot be searched for. Accordingly, the in-loop filtering is applied when encoding ends in units of blocks.

Particularly, in the in-loop filter unit 1080 according to an embodiment of the present invention, the filtering coefficient value may be calculated based on a difference between an original pixel and a restored pixel, a certain coefficient value may be predefined and used, or the filtering coefficient value may be calculated based on the restored pixels.

Further, information on the difference between the original pixel and the restored pixel may be sent in units of pixels, or pixels may be grouped according to a specific criterion and a representative difference value of each group may be sent to the decoder. Particularly, the in-loop filter unit 1080 may perform existing filtering (for example, de-blocking filtering) and filtering for correcting the difference value due to the distortion between the original video and the restored video, in combination. In this case, information on application of the filtering may be sent to the decoder in units of sequences, pictures, slices, blocks or the like.

Accordingly, the encoder according to an embodiment of the present invention may perform encoding while changing whether to perform filtering, the number of filtering (the type of filtering), a filtering direction and a filtering intensity based on the distortion between the original video of the restored video obtained by summing the residual video and the prediction video and the restored video or based on characteristics of the restored video.

That is, in the encoder according to an embodiment of the present invention, an additional filter for improving image quality of an encoded frame may be applied. As the additional filter, an existing de-blocking filter may be used, as well as filtering may be performed using a difference between the pixel of the original video and the pixel of the restored video due to the distortion between the original video and the restored video, using a coefficient based on the difference, or based on characteristics of the restored video. Thus, the additional filter may be applied independently from or together with the de-blocking filtering. Whether to apply the additional filter may be determined according to a size of the block or directivity of the block.

Accordingly, the in-loop filter unit 1080 according to an embodiment of the present invention may include at least one filter. A filter of the in-loop filter unit 1080 may include a de-blocking filter and at least one additional filter.

Further, the in-loop filter unit 1080 may determine presence or absence of a filtering to be applied, the number of filters, the type of filter or the like according to the size of the block or the directivity of the block. Thus, it is possible to reduce the distortion between the original video and the restored video as well as improve coding efficiency and subjective image quality. For example, when the size of the block is M×N and the directivity of the block is vertical as in FIG. 6B, a filter such as [¼, ½, ¼] may be applied or when the directivity of the block is horizontal, the above filter may not be applied. Thus, the number of filters or the type of filter may be determined.

The memory unit 1090 stores the current block subjected to the in-loop filtering so that the current block may be used as reference data when a next block of the current block or another block is encoded in future.

The encoding unit 1091 outputs a bit stream by encoding the quantization frequency coefficient string using an entropy coding scheme or the like. As this coding technology, entropy coding technology may be used but is not limited thereto. Various coding technologies may be used.

Further, the encoding unit 1091 may include a bit string in which quantization frequency coefficients have been encoded as well as various information necessary to decode the encoded bit string, in the encoding data. That is, the encoding data may include an encoded block pattern (CBP), a delta quantization parameter, a bit string in which the quantization frequency coefficient has been encoded, and a bit string for information necessary for prediction.

Figure 11:
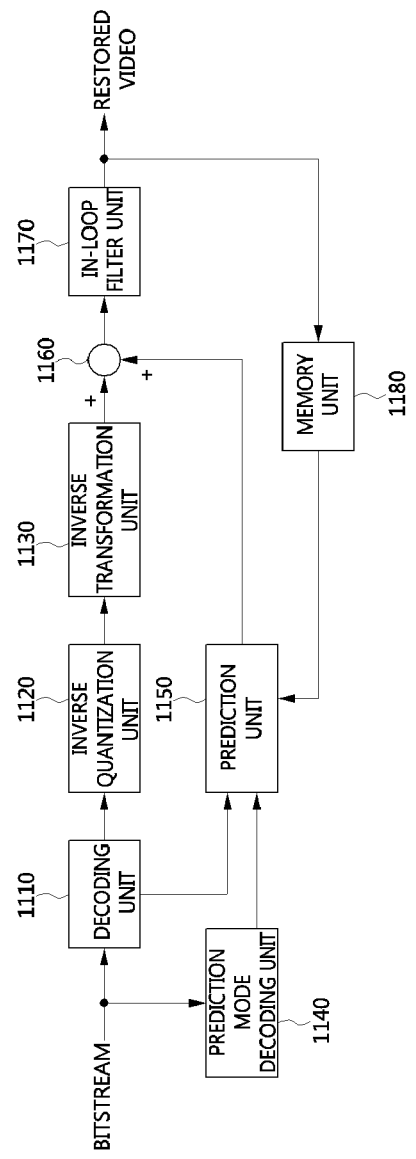
FIG. 11 is a block diagram for explaining a configuration example of a video decoding device in which the intra prediction method according to the present invention has been implemented.

Configuration example of video decoding device in which intra prediction method according to the present invention has been implemented FIG. 11 is a block diagram for explaining a configuration example of a video decoding device in which the intra prediction method according to the present invention has been implemented.

Referring to FIG. 11, a video decoding device according to the present invention may include a decoding unit 1110, an inverse quantization unit 1120, an inverse transformation unit 1130, a prediction mode decoding unit 1140, a prediction unit 1150, an addition unit 1160, an in-loop filter unit 1170, and a memory unit 1180.

The decoding unit 1110 may decode and quantize a bit stream to extract a quantization frequency coefficient string, and inversely scan the quantization frequency coefficient to generate a residual block having a quantization frequency coefficient.

The inverse quantization unit 1120 and the inverse transformation unit 1130 perform the same or similar functions as the inverse quantization unit 1050 and the inverse transformation unit 1060 of the video encoding device described with reference to FIG. 10, respectively, and accordingly a detailed description thereof will be omitted.

The prediction mode decoding unit 1140 decodes information on a prediction mode from the bit stream. When it is determined to be intra prediction in the prediction unit 1010 of a video encoding device, information on whether prediction has been performed using the first method or the second method, which mode is used when the prediction has been performed using the first method, and whether the prediction method using the template or the prediction method searching for a block similar to a current block is used when the prediction has been performed using the second method is decoded. When the prediction is performed using the template, the information on a, b, m, and n described above is decoded, and when the prediction is performed by searching for a block similar to the current block, information such as information on motion, information on a predictor of the motion is decoded. Some of the information may not be necessarily included and some or all of the information may be selectively included in some implementations.

The prediction unit 1150 performs a similar role to the prediction unit 1010 in the encoder and accordingly a detailed description thereof will be omitted.

The addition unit 1160 adds a prediction block generated by the prediction unit 1150 to the residual block restored by the inverse transformation unit 1130 to restore a target block. The restored target block is filtered by the in-loop filter unit 1170 and then stored in the memory unit (1180) so that the target block can be used as reference data when a next block of a current block or another block is restored in future.

The in-loop filter unit 1170 plays a similar role to that in the encoder and accordingly a detailed description thereof will be omitted.

While the preferred embodiments of the present invention have been described, it should be understood by those skilled in the art that various changes and alterations may be made to the present invention without departing from the spirit and scope of the invention defined by the appended claims.

What is claimed is:

1. A video decoding method performed by a video decoding apparatus, the method comprising:
    decoding, from a bitstream, a residual block of a current block;
    generating a prediction block through intra prediction, the intra prediction being performed by using an intra prediction mode relating to the current block and neighboring pixels adjacent to the current block;
    determining, based on a direction of the intra prediction mode and based on a size of the current block, whether to perform first filtering on at least one predicted pixel adjacent to a boundary of the prediction block, the direction of the intra prediction mode being used to specify the neighboring pixels used for the intra prediction on the current block and the direction of the intra prediction mode including a vertical direction;
    determining, based on the direction of the intra prediction mode, a location of the at least one predicted pixel on which the first filtering is performed;
    performing the first filtering on the at least one predicted pixel adjacent to the boundary of the prediction block when the first filtering is determined to be performed;
    generating a restored block by summing the residual block and the prediction block subject to the first filtering;
    performing in-loop filtering on the restored block; and
    storing the restored block subjected to the in-loop filtering in a frame buffer,
    wherein the in-loop filtering comprises a de-blocking filtering on the restored block.

2. The method of claim 1, wherein the boundary to which the at least one predicted pixel is adjacent is determined to be a top boundary, a bottom boundary, a left boundary or a right boundary of the prediction block in accordance with the intra prediction mode.

3. A video encoding method performed by a video encoding apparatus, the method comprising:
    generating a prediction block by performing an intra prediction on a current block, the intra prediction being performed by using an intra prediction mode relating to the current block and neighboring pixels adjacent to the current block;
    determining, based on a direction of the intra prediction mode and based on a size of the current block, whether to perform first filtering on at least one predicted pixel adjacent to a boundary of the prediction block, the direction of the intra prediction mode being used to specify the neighboring pixels used for the intra prediction on the current block and the direction of the intra prediction mode including a vertical direction;
    determining, based on the direction of the intra prediction mode, a location of the at least one predicted pixel on which the first filtering is performed;
    performing the first filtering on the at least one predicted pixel adjacent to the boundary of the prediction block when the first filtering is determined to be performed;
    generating a residual block by subtracting the prediction block subject to the first filtering from the current block;
    encoding the residual block into a bitstream;
    decoding the residual block through inverse quantization and inverse transformation;
    generating a restored block by summing the decoded residual block and the prediction block subject to the first filtering;
    performing in-loop filtering on the restored block; and
    storing the restored block subjected to the in-loop filtering in a frame buffer,
    wherein the in-loop filtering comprises a de-blocking filtering on the restored block.

4. The method of claim 3, wherein the boundary to which the at least one predicted pixel is adjacent is determined to be a top boundary, a bottom boundary, a left boundary or a right boundary of the prediction block in accordance with the intra prediction mode.

5. A non-transitory computer-readable recording medium storing a bitstream that is generated by a video encoding method performed by a video encoding apparatus, the method comprising:
    generating a prediction block by performing an intra prediction on a current block, the intra prediction being performed by using an intra prediction mode relating to the current block and neighboring pixels adjacent to the current block;
    determining, based on a direction of the intra prediction mode and based on a size of the current block, whether to perform first filtering on at least one predicted pixel adjacent to a boundary of the prediction block, the direction of the intra prediction mode being used to specify the neighboring pixels used for the intra prediction on the current block and the direction of the intra prediction mode including a vertical direction;
    determining, based on the direction of the intra prediction mode, a location of the at least one predicted pixel on which the first filtering is performed;
    performing the first filtering on the at least one predicted pixel adjacent to the boundary of the prediction block when the first filtering is determined to be performed;
    generating a residual block by subtracting the prediction block subject to the first filtering from the current block;
    encoding the residual block into a bitstream;

decoding the residual block through inverse quantization and inverse transformation;

generating a restored block by summing the decoded residual block and the prediction block subject to the first filtering;

performing in-loop filtering on the restored block; and storing the restored block subjected to the in-loop filtering in a frame buffer, wherein the in-loop filtering comprises a de-blocking filtering on the restored block.

6. The non-transitory computer-readable recording medium of claim 5, wherein the boundary to which the at least one predicted pixel is adjacent is determined to be a top boundary, a bottom boundary, a left boundary or a right boundary of the prediction block in accordance with the intra prediction mode.

7. A non-transitory computer-readable recording medium storing a bitstream that is received and decoded by a video decoding apparatus to reconstruct a current block included in an image, the bitstream comprising:

encoded residual block information; and prediction information of the current block, wherein the encoded residual block information is decoded to generate a residual block of the current block, the prediction information is used to generate a prediction block of the current block by performing an intra prediction on the current block, the intra prediction being performed by using an intra prediction mode relating to the current block and neighboring pixels adjacent to the current block, whether to perform first filtering on at least one predicted pixel adjacent to a boundary of the prediction block is determined based on a direction of the intra prediction mode and based on a size of the current block, the direction of the intra prediction mode being used to specify the neighboring pixels used for the intra prediction on the current block and the direction of the intra prediction mode including a vertical direction, a location of the at least one predicted pixel on which the first filtering is performed is determined based on the direction of the intra prediction mode, the first filtering is performed on the at least one predicted pixel adjacent to the boundary of the prediction block when the first filtering is determined to be performed, the residual block and the prediction block subject to the first filtering are summed to reconstruct the current block, the reconstructed current block is filtered by in-loop filtering, and the reconstructed current block subjected to the in-loop filtering is stored in a frame buffer, wherein the in-loop filtering comprises a de-blocking filtering on the reconstructed current block.

8. The non-transitory computer-readable recording medium of claim 7, wherein the boundary to which the at least one predicted pixel is adjacent is determined to be a top boundary, a bottom boundary, a left boundary or a right boundary of the prediction block in accordance with the intra prediction mode.

* * * * *